United States Patent
Rubenstein (10) Patent No.: US 8,352,291 B2
(45) Date of Patent: Jan. 8, 2013

(54) INNOVATIONS IN HEALTH INSURANCE

(76) Inventor: Joel J. Rubenstein, Newton, MA (US)

( * ) Notice: Subject to any disclaimer, the term of this patent is extended or adjusted under 35 U.S.C. 154(b) by 2023 days.

(21) Appl. No.: 09/962,931

(22) Filed: Sep. 25, 2001

(65) Prior Publication Data

US 2002/0077855 A1 Jun. 20, 2002

Related U.S. Application Data

(60) Provisional application No. 60/235,358, filed on Sep. 26, 2000.

(51) Int. Cl.
G06Q 40/00 (2012.01)
(52) U.S. Cl. .................. 705/4; 705/2; 705/3
(58) Field of Classification Search .......... 705/2–4
See application file for complete search history.

(56) References Cited

U.S. PATENT DOCUMENTS

| | | | | |
|---|---|---|---|---|
| 5,918,208 | A * | 6/1999 | Javitt | 705/2 |
| 6,584,445 | B2 * | 6/2003 | Papageorge | 705/3 |
| 2001/0037216 | A1 * | 11/2001 | Oscar et al. | 705/2 |
| 2002/0038310 | A1 * | 3/2002 | Reitberg | 707/104.1 |

OTHER PUBLICATIONS

EU Drug Pricing: The Imlications of Maastricht, Apr. 1997, Marketletter.*

"Aetna Members to Get More Choices Freedom Would Come at Higher Price," Hartford Courant, News Archive http://nl9.newsbank.com/nl-search/we/Archives?p_action.doc&p_docid=0EAF8C774394 . . . , Jan. 15, 2002.

"Oxford Health Plans Offers New Small Group Plan—Freedom Plan Metro to Offer More Attractive premiums," Company News on Call, http://www.prnewswire.com/cgi-bin/stories.pl?ACCT=105&STORY=/www/story/09-07-' . . . Jan. 15, 2002.

Ceniceros, R., "Employers Scrutinize Prescription Drug Costs," Business Insurance, pp. 3 and 6, Aug. 2, 1999.

Summary of Benefits, HMO Blue® New England, Blue Cross Blue Shield.

Rubenstein, M.D., Joel J., "The high cost of marginal benefits", The Boston Sunday Globe, May 2, 1993, 2 pages.

* cited by examiner

Primary Examiner — David Rines
(74) Attorney, Agent, or Firm — Hamilton, Brook, Smith Reynolds, P.C.

(57) ABSTRACT

One aspect of the present invention includes determining a variable medical co-payment according to marginal clinical utility. A set of clinical factors are processed to identify a specific clinical condition. As provided by an independent panel of physicians, medical care alternatives are described for the specific clinical condition. The independent panel of physicians further indicates corresponding marginal clinical utilities of the medical care alternatives. Variable co-payments are applied to the medical care alternatives in an inverse relationship with the corresponding marginal clinical utilities.

15 Claims, 9 Drawing Sheets

Some Marginally Useful Services

DRUGS
- Non-formulary
- Convenience dosing
- Trade name

UNPROVEN MEDICAL DIAGNOSTIC TECHNIQUES

UNPROVEN MEDICAL TREATMENTS

CARDIOLOGY
- Certain imaging techniques
  - chest pain
- Diagnostic ultrasound
  - functional murmurs
- EKG
  - after potentials
  - certain routine
- Certain high-tech pacing systems
- PCI in certain subgroups with CAD absent maximal medical therapy GASTROENTEROLOGY
- Colonoscopy
  - <50 without family history
  - <45 irritable bowel
- Gastroscopy
  - <45 for dyspepsia
- Proton pump inhibitor
  - first line therapy
- Eradicate H. Pylori
  - without acid peptic disease NEUROLOGY
- CAT scans
  - headache without red flags
- Plain films of cervical spine
  - neck pain
- Lumbrosacral spine film
  - initial work-up of back pain without red flags
- Epidural steroids
  - back pain

FIG. 9

INNOVATIONS IN HEALTH INSURANCE

RELATED APPLICATION

This application claims the benefit of U.S. Provisional Application No. 60/235,358, filed on Sep. 26, 2000. The entire teachings of the above application is incorporated herein by reference.

BACKGROUND

Figure 1:
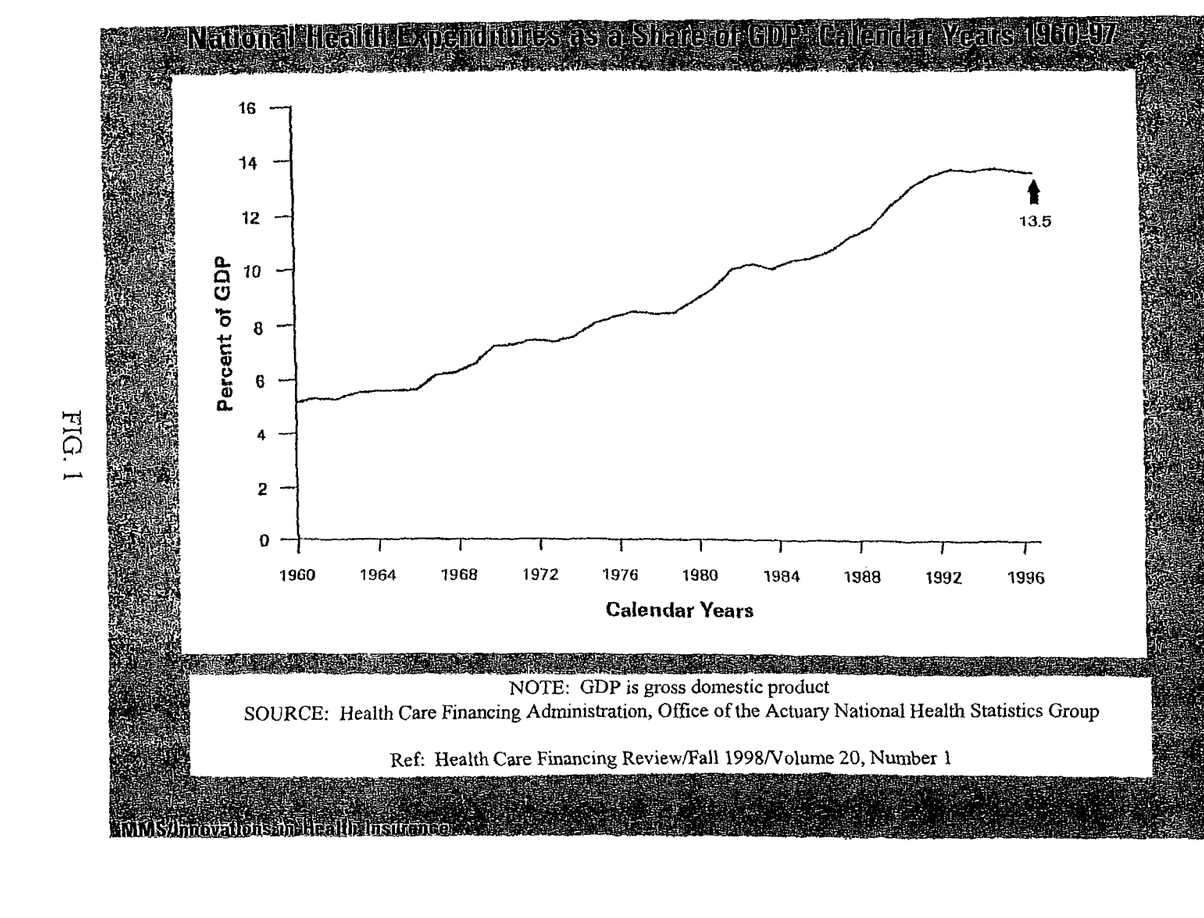
FIG. 1 is a plot of the growth of health care expenditures as a percentage of gross domestic product from 1962 to 1998.

Healthcare policy today is driven by concern for those increasing costs while at the same time medical outcomes are under increasing scrutiny. FIG. 1 plots the growth of healthcare expenditures as a percent of gross domestic product from 1960 to 1998. Note first that the healthcare expenditure proportion of GDP has grown from about 5% to 13.5% over the 38 year period. Double-digit growth of health expenditure in the 70's and 80's resulted in this rather steep portion of the curve, and the health expenditure as a proportion of GDP has been stable for the past six years, around 13.5%. This is due to a marked slowing of the health expenditure growth to about 4-5% per year as well as a growing gross domestic product. However, despite a stable percent over the past five years, in 1996 the national health expenditure moved over a trillion dollars with a 400 billion dollar growth since 1990. Thus, healthcare expenditures remain quite a concern.

Figure 2:
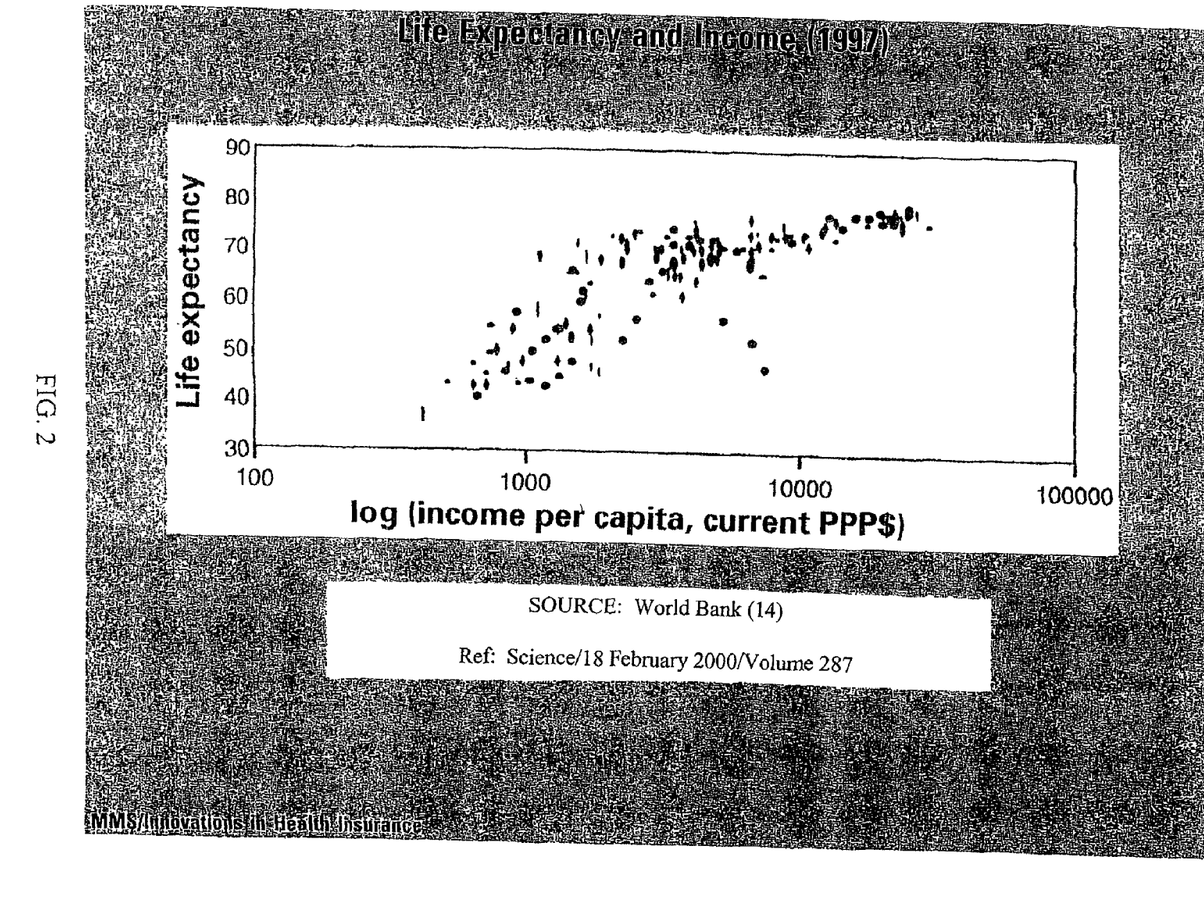
FIG. 2. is a plot of life expectancy in relationship to per capita income.

At the same time that costs were rising dramatically, some outcome measures appeared to be reaching plateaus. FIG. 2 is a plot of life expectancy in relationship to per capita income, published in February in "Science" by David Bloom at the Harvard School of Public Health. This is an international comparison. Per capita income is generally a surrogate for total healthcare expenditure and, as can be seen, life expectancy seems to plateau with higher levels of spending. Certain other gross outcome measures, such as mortality and infant mortality, while falling, do not seem to be falling at the same rate as cost increase. This has led some policy makers to question the "value" of increased expenditure.

Health value, in this sense, is defined as the ratio of health outcomes divided by health expenditures or health outcomes divided by the cost per service times the volume of services. The numerator, that is health outcomes, will be the subject of other papers on quality and its determinants, but attempts to control and reduce the denominator have essentially led to the topic discussed herein.

First, attempts to control price failed in the 70's as it was impossible to stifle basic economic laws. Efforts to limit services by regulating capital expenditures through the determination of need process in the 80's similarly did not control the volume of services. Other mechanisms to control volume then followed. Second opinions came and went, but defining certain services as unnecessary and, therefore, not covered continues as a major technique today.

Figure 3:
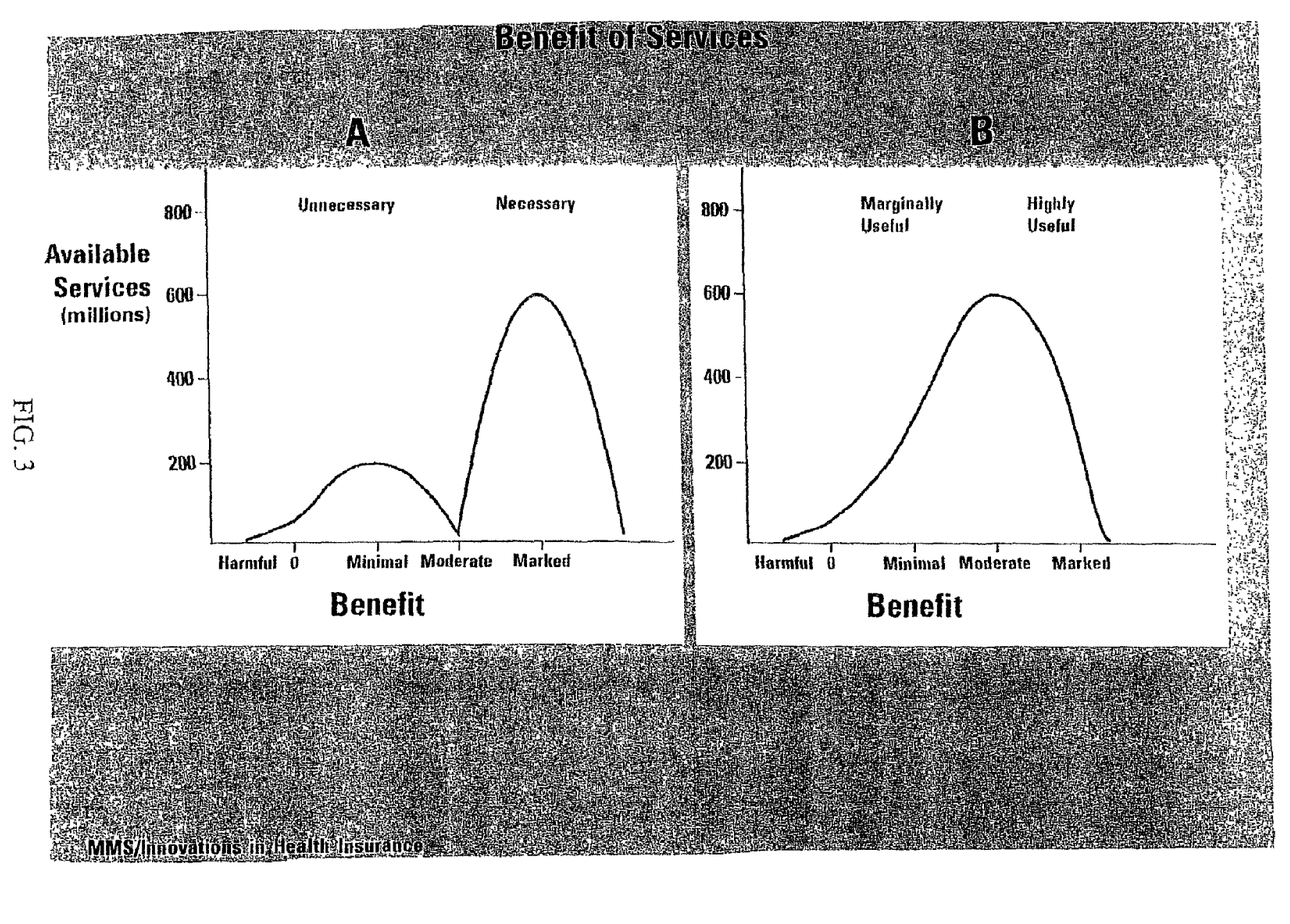
FIG. 3 is a plot of medical benefit versus available medical services.

It would be convenient if all services could be clearly defined neatly into universes of necessary and unnecessary services, but they cannot. Referring to FIG. 3, Panel A reflects the unrealistic notion that services can be simply defined as (i) unnecessary assuming they are harmful or have no or minimal benefit, or (ii) necessary, assuming they have moderate or marked benefit. Reality is reflected in Panel B, where the universe of services are arrayed in a continuum of benefit with a few that are harmful to those that carry no effect to those that are minimally, moderately, or markedly effective. Low yield is not no yield.

In the terms defined herein, many services are marginally useful. For example, CAT scan will pick up a rare malignancy presenting as a headache, and a thallium stress test is 8-10% more sensitive than an exercise tolerance test alone in discovering an ischemic cause for atypical chest pain. Yet, many of today's insurance plans force an unnatural choice where decisions are made by administrative fiat or by a panel of physicians or ultimately by the court. This is a suboptimal approach to medical service distribution.

The current effort to control the volume of services relies upon a mechanism that combines the financing and the delivery of services into a single unit that includes the physician, placing economic risk upon the physician. These systems encourage the physicians to limit marginally useful services in the interest of efficiency, in the interests of the health plan, or on behalf of the remainder of their own insured panel. While such "reversal" of the economic incentives may be successful, these systems threaten the physician-patient relationship, particularly when global budgets are under increasing pressure in a competitive model.

Now described is one anecdote from the inventor's own experience and several quotations to describe the impact of this system of resource management. "I received a call from a high school classmate about fifteen years ago who I had not heard from about 10 years before that. He told me that he was just diagnosed with Hodgkin's Disease and he was concerned that his health plan might not do everything possible for him. I was supposed to reassure him that his own physicians were primarily concerned with his well-being. This apparent sense of mistrust between my classmate and his healthcare providers starkly foretold our concern for the disruption in physician-patient advocacy so evident today."

Victor Fuchs, Ph.D., in a 1984 "Sounding Board" article said, "Low yield medicine is not no yield medicine For physicians to have to face these tradeoffs explicitly every day is to assign an unreasonable and unbearable burden." Norman Levinsky, M.D., former Chairman of Medicine at Boston University, in a "Sounding Board" article wrote, "when practicing medicine, doctors cannot serve two masters. It is to the advantage of both our society and of the individuals it comprises that physicians retain their historic single-mindedness. The doctor's master must be the patient."

Finally, a recently retired Editor-in-Chief of the "New England Journal", Jerome Kassirer, M.D., in a 1998 editorial wrote, "If we capitulate to an ethic of the group rather than the individual, and if we allow market forces to distort our ethical standard, we risk becoming economic agents instead of healthcare professionals. Inevitably, patients will suffer and so will the noble profession."

As we have seen, society has made it plain that we have reached the limit of resources that should be allocated to healthcare, and many people and business concerns wish to reduce the healthcare expenditure from its present levels.

SUMMARY

Let us now explore alternative mechanisms that might reduce the use of less effective or minimally effective services. Such a mechanism should reject the arbitrary assignment of medical services as necessary or unnecessary. Such a mechanism should maintain the historic advocacy of physicians for patients. Such a mechanism should maximize the welfare of patients who might wish to exchange marginally or minimally effective medical services for some alternative use of their resources.

A mechanism that meets these criteria is provided by an embodiment of the present invention, which provides a health insurance system that uses co-payments that vary inversely with marginal clinical utility. Co-payments are an old insurance strategy. However, to date, co-payments have not been based on the extent of medical services' usefulness. This new insurance approach controls health expenditures for services of limited clinical utility by requiring higher patient co-payments. This insurance plan is be based on a tiered system, where the levels of co-payments are based on medical consensus as to the services' clinical utility. There are low levels of co-payments for services that are agreed upon to be highly useful, for example, an exercise stress test for atypical chest pain; and there are relatively high co-payments for services agreed to be of limited marginal utility—for example, repeat fetal ultrasounds for a low-risk pregnancy.

One aspect of the present invention includes determining a variable medical co-payment according to marginal clinical utility. A set of clinical factors are processed to identify a specific clinical condition. As provided by an independent panel of physicians, medical care alternatives are described for the specific clinical condition. The independent panel of physicians further indicates corresponding marginal clinical utilities of the medical care alternatives. Variable co-payments are applied to the medical care alternatives in an inverse relationship with the corresponding marginal clinical utilities.

In one embodiment of the present invention, the medical care alternatives include diagnostic, therapeutic, or surgical options. Processing and other functions used to determine the variable medical co-payment may be executed by a database operating on a computing device, where the computing device may be coupled to a computer network in which various processes are distributed about nodes on the network. In a typical situation, the set of clinical factors are provided by a treating physician. The present invention may be applied to an insurance system, where benefits provided by the insurance system are described according to the relationship between the marginal clinical utilities and variable co-payments.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Current insurance systems, with first dollar coverage or with minimal co-payments, reject the concept of true direct cost to the consumer, and thus, all services, even marginally useful ones, are expected. Given well-known economic theory that links lower price to increased demand, it is not surprising that the current insurance system must use non-market mechanisms to control the use of medical services.

Co-payments are an effective tool for limiting medical services. The Rand Health Insurance Experiment demonstrated their impact, and such co-payments have been incorporated into a number of insurance products. However, those systems do not link co-payment level to medical utility/effectiveness; thus, the expected reduction in services related to co-payments will have an unpredictable effect upon the quality of care as both effective and less effective services are reduced. In contrast, linkage of the co-payment level to marginal medical effectiveness should preferentially reduce less effective medical services.

In a variable co-payment system, according to the principles fo the present invention, patients seek to maximize their welfare by exchanging marginally useful medical benefits for other useful goods and services. The physician retains an advocacy role for the patient as he or she advises the patient to use or reject the services considering the medical as well as the economic interests of the patient. The physician should have no economic interest in the rejection of the service. The informed consumer makes a judgment to maximize his or her overall welfare.

What is the mechanism by which to link certain services with a defined marginal benefit and therefore a defined co-payment?

Cost-effectiveness theory attempts to quantify the value of a service by relating cost to incremental quality-adjusted life years. While it is useful to array all medical services against each other, the assumption that all individuals can be defined by the same quality of life standard is probably incorrect. Alternatively, co-payments for specific services could vary as they are applied to specified clinical conditions. For example, the co-payment for services to evaluate the presence of ischemia in patients with chest pain syndromes would be compared to each other and not compared to services to evaluate knee pathology in patients with knee pain.

Figure 4:
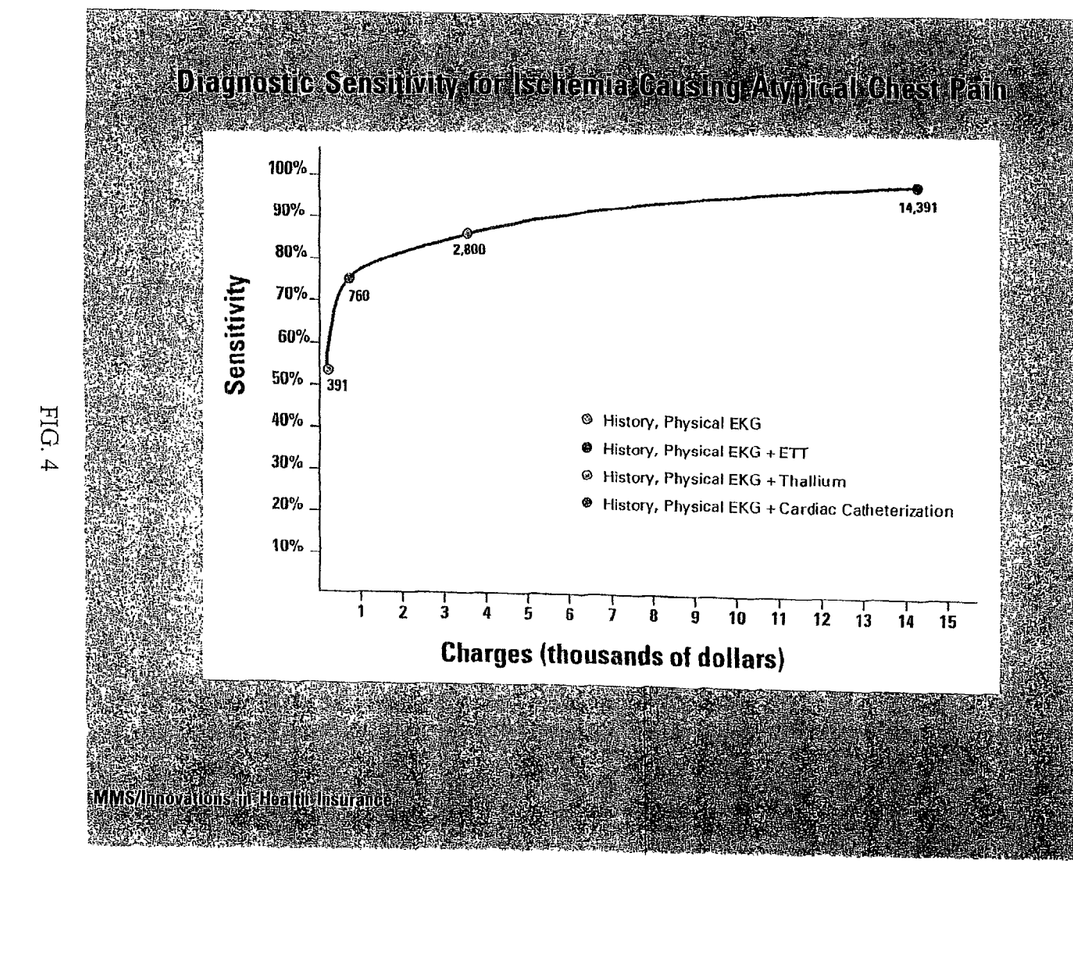
FIG. 4 is a plot of diagnostic sensitivity for ischemia causing atypical chest pain versus the cost for running various associated diagnostic tests.

FIG. 4 illustrates this clinical situation. In this example, differing strategies are considered to evaluate a patient with an atypical chest pain syndrome and a normal EKG. The ordinate describes the sensitivity for a diagnosis of ischemia as a cause of atypical chest pain. The abscissa represents the total expenditure for a given diagnostic strategy. After the history, physical exam, and EKG, a treating physician can be about 55% sure of not missing the diagnosis at a cost of about $400. Adding an ETT increases the sensitivity to 75% at an incremental cost of about $400. Adding an imaging technique, such as thallium, adds a smaller increment of about 8-10% to the sensitivity at an increase of cost of about $2,000. An additional 8-10% sensitivity is even more expensive at an incremental cost of at least about $10,000. In this example, there might be no co-payment for a regular treadmill stress test, but when the stress test is combined with additional imaging techniques, there might be a 15-20% co-payment assigned to the incremental cost.

If a patient absolutely insists on 95% sensitivity for the diagnosis, the co-payment for a catheterization would be in the range of 50% of the incremental cost. This approach defines a regular treadmill test as a basic benefit in this clinical setting. This is consistent with AHA guidelines that a regular treadmill test is indicated in this scenario. A host of other clinical scenarios could be described with their marginally useful services, ranging from repetitive fetal ultrasound in otherwise normal pregnancy to the use of CAT scans for headache or MRI for knee pain without a therapeutic trial and on and on.

A disinterested, independent panel of physicians, and/or others, would define co-payments based upon the marginal benefit of services for the condition under discussion. Instructions to the panel as it constructs a process might include: "What are those services for the condition that no one should be denied?" This implies no co-payment. Secondly, "what are those services that minimally add to the diagnosis or treatment?", defining the highest co-payment, and finally, those services remaining define a modest or intermediate co-payment.

Recently, there has been an extensive development of clinical practice guidelines, appropriateness scales, and cost-effectiveness studies that would inform the process of determining marginal utilities and appropriate co-payment levels. Here is an example from the Rand Appropriateness Study for coronary Bypass Surgery where nine physicians were asked to rate the appropriateness of coronary bypass in a specific clinical situation on a scale from 1 to 9.

When combining such a scale with the principles of the present invention the highest appropriate scores defining "necessary care" are associated with the lowest co-payment, the middle group are associated with the intermediate co-payment, and finally, the lowest appropriate scores are associated with the highest co-payment. There have been multiple other attempts to perform such appropriateness studies. These vary from various governmental efforts, such as the State of Oregon, to a number of proprietary companies.

Figure 5:
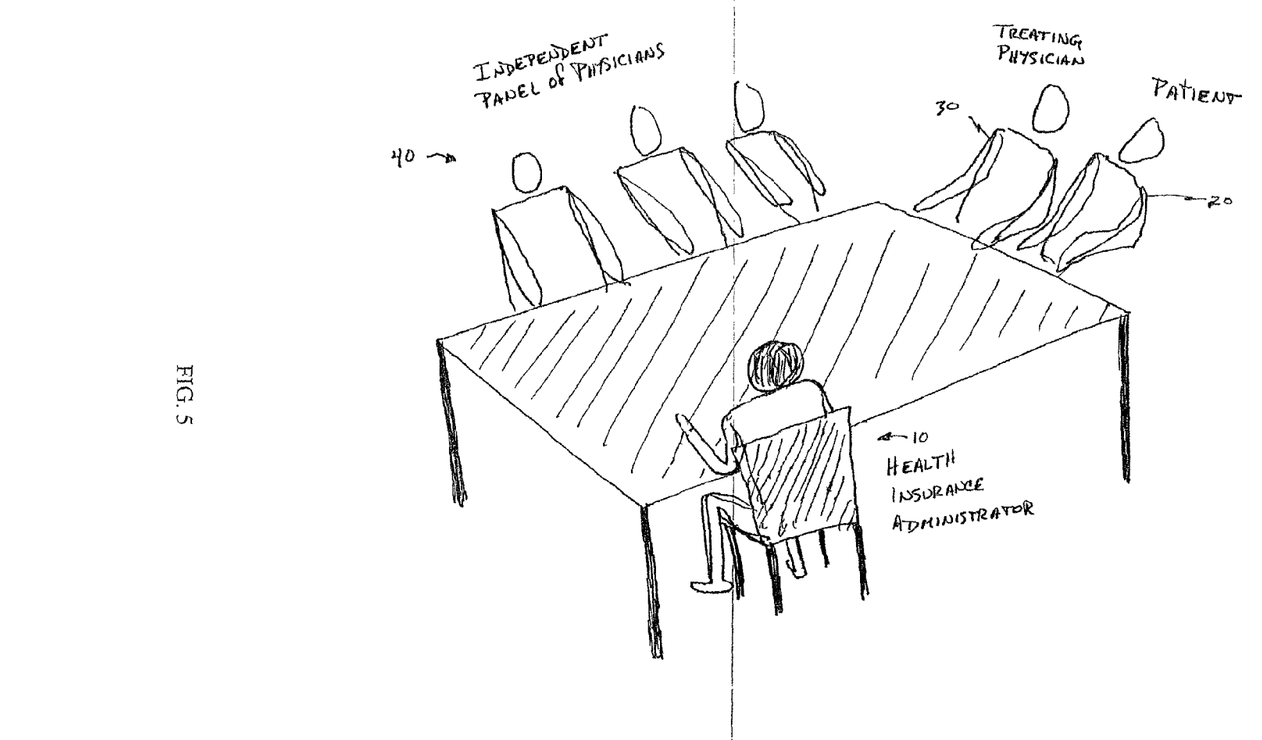
FIG. 5 is a pictorial diagram of a low-technology interaction among parties related to the health insurance according the principles of the present invention.

FIG. 5 illustrates the parties involved with a health insurance system according to the principles of the present invention. A health insurance administrator 10 represents the health insurance company. A patient 20 has a contract with the health insurance company and sees a treating physician 30 who is possibly a physician within a network of physicians provided by the health insurance company. An independent panel of physicians 40 provides information to the health insurance company for a range of clinical factors, such as medical history, physical examination and laboratory results, anticipated to be provided by the treating physician 30.

Examples of information provided to the insurance company by the independent panel of physicians 40 include specific clinical conditions, medical care alternatives, and marginal clinical utilities of the medical care alternatives. Based on the information provided by the independent panel of physicians 40, the health insurance administrator 10 can (i) assess (a) costs associated with the medical care alternatives and (b) corresponding marginal clinical utilities, and (ii) apply variable co-payments to the medical care alternatives in an inverse relationship with the marginal clinical utilities.

In an alternative embodiment, the independent panel of physicians 40 determine the variable co-payments associated with the medical care alternatives. In yet another embodiment, the independent panel of physicians 40 and health insurance administrator 10 collaborate or negotiate to apply the variable co-payments to the medical care alternatives in the inverse relationship with the marginal clinical utilities. Still further, a predetermined formula may be agreed upon by the parties for setting the variable co-payments in an inverse relationship with the marginal clinical utilities.

Continuing to refer to FIG. 5, in this low-technology example in which the several parties sit around a conference table, the process for determining the variable co-payments tends to be slow. Therefore, a high-technology solution is also provided to expedite the determination of variable co-payments to almost a real-time information retrieval. Examples of such high-technology solutions follows.

One embodiment of the present invention in a high-technology form can be implemented in a desktop personal computer (PC), described as follows. Using defined clinical processes, a treating physician at the point of service accesses the clinical processes for determining the variable co-payments using a desktop PC. Variable co-payments for various levels of service (i.e., medical care alternatives) in the specific clinical setting are rapidly displayed following the input of certain, hopefully few, clinical parameters. The variable co-payments are applied to the medical care alternatives in an inverse relationship with corresponding marginal clinical utilities, which are defined by an independent panel of physicians, as discussed above. An informational dialogue regarding the need for the service is expected to ensue between the treating physician and the patient, and the treating physician makes a recommendation. Ultimately, the patient decides whether to proceed with a marginally useful service. The patient is therefore better informed, and the treating physician remains an advocate, considering the patient's broadly defined medical needs as well as their financial needs.

Patients and physicians intuitively understand that a substantial proportion of medical services are marginally useful. This is supported both by epidemiologic data, which demonstrates a plateau in outcome with increased expenditure, as well as microdiagnostic data, such as discussed above in reference to chest pain syndrome.

Figure 6:
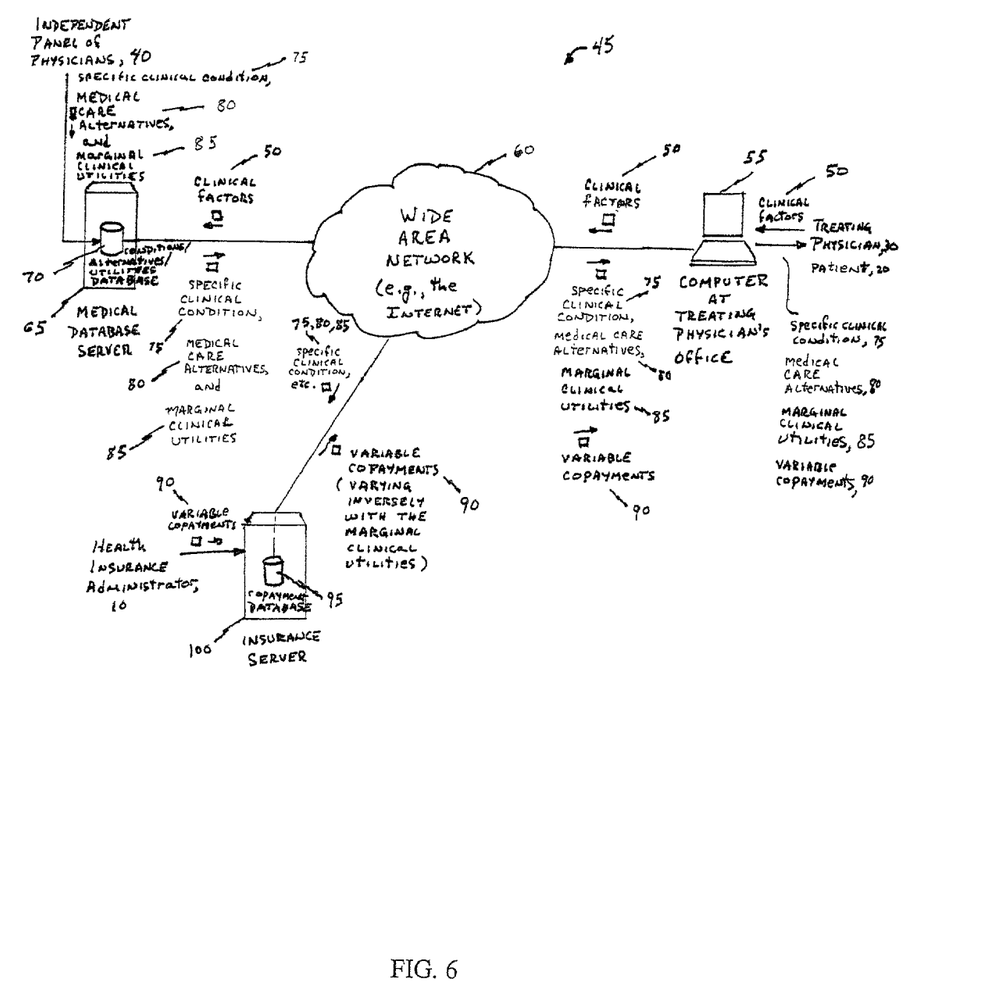
FIG. 6 is a block diagram of a high-technology implementation for interaction among the parties of FIG. 5.

FIG. 6 is another high-technology embodiment for determining a variable medical co-payment according to marginal clinical utility. In this embodiment, today's computer networks are employed to access data located in various servers distributed about the computer network for retrieving information to be discussed by the treating physician 30 and patient 20.

Beginning on the right side of the computer network 45, the patient 20 is examined by the treating physician 30. The treating physician 30 enters a set of clinical factors 50 into a computer 55 at the examination office. The clinical factors 50 are packetized and transmitted across the network, possibly across a wide area network such as the Internet 60. The clinical factors 50 are received, in one embodiment, by a medical database server 65.

Inside the medical database server 65 is a conditions/alternatives/utilities database 70 providing information to the treating physician 30 and patient 20 in response to the received clinical factors 50. The information includes specific clinical conditions 75, medical care alternatives 80, and marginal clinical utilities 85. This information is defined by the independent panel of physicians 40. It should be understood that the specific clinical conditions 75 are determined as a function of the clinical factors 50. The medical care alternatives 80, which include diagnostic, therapeutic, or surgical options, for example, are provided based on the specific clinical conditions 75, and the marginal clinical utilities 85 correspond to the medical care alternatives 80.

Thus, given the clinical factors 50, the database 70 is able to provide at least three pieces of data, including the specific clinical condition 75, medical care alternatives 80, and marginal clinical utilities 85.

These data are packetized and transmitted through the wide area network 60 to a co-payment database 95 in an insurance server 100. The co-payment database 95 is initialized with variable co-payments 90 by the health insurance administrator 10 as described above. Thus, based on the data 75, 80 and 85, the co-payment database 95 provides variable co-payments 90 that vary inversely with the marginal clinical utilities as discussed above.

In an alternative embodiment, the variable co-payments are provided by the conditions/alternatives/utilities database 70 in conjunction with the marginal clinical utilities 85, thus removing the need for the separate co-payment database 95 at the insurance server 100.

The variable co-payments 90 and other data 75, 80 and 85 are then received back at the computer 55 in the treating physician's office. The treating physician 30 and patient 20 are then able to view this data and make informed, economically sound decisions on the part of the patient 20, based on the specific clinical condition 75 corresponding to the given clinical factors 50. It should be understood that the data is viewed in a typical computer display when displayed by the computer 55.

The databases 70 and 95 can operate on a single server or even on the computer 55 at the treating physician's office. Further, processes for determining the variable co-payments and other data may be implemented in a form other than one that employs a database or may partially employ a database. The databases or other processes are typically stored in computer readable media located at the servers 65 and 100 or at the computer 55. Such computer readable media include CD-ROMS, magnetic discs, Read Only Memory (ROM), or other computer readable media. Updates for the data described above can be done via the network 45 or through distribution of computer media in another manner.

Figure 7:
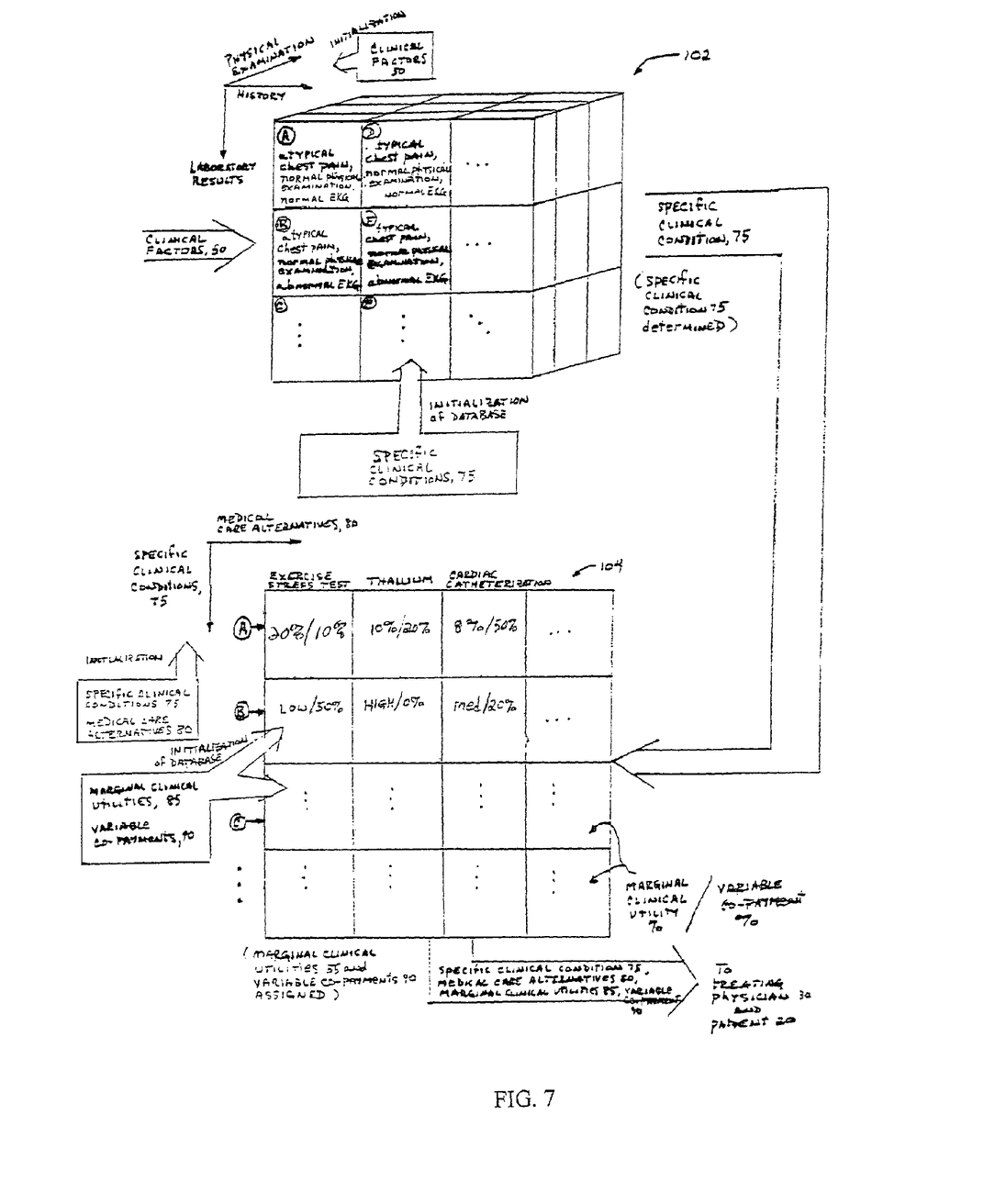
FIG. 7 is a flow diagram of an embodiment of a process used by a database operating on at least one computing device of the computer network of FIG. 6.

FIG. 7 is a flow diagram for determining the variable medical co-payments described above but employing databases partitioned in a different manner. A first database 102 is initialized with clinical factors 50 and specific clinical conditions 75 determined as a function of the clinical factors 50. A second database 104 is initialized with specific clinical conditions 75, medical care alternatives 80, marginal clinical utilities 85, and variable co-payments 90. As discussed above, the specific clinical conditions 75, medical care alternatives 80, and marginal clinical utilities 85 are provided by the independent panel of physicians 40, and the variable co-payments 90 are provided by the health insurance company.

In operation, the first database 102 receives clinical factors 50. Responsively, the first database 102 determines a specific clinical condition 75. The specific clinical condition is provided by the first database 102 to the second database 104 as an input for retrieval of other data. In response to the specific clinical conditions 75, the second database 104 provides three data including: corresponding medical care alternatives 80, marginal clinical utilities 85, and variable co-payments 90 varying in an inverse relationship with the corresponding marginal clinical utilities 85.

Included in FIG. 7 is an example based on the information provided in FIG. 4. Beginning with the entry into the first database 102 of the clinical factors of ischemia causing atypical chest pain, a specific clinical condition 75 is determined. For example, the specific clinical condition 75 may include the information included in database cell A, namely: atypical chest pain, normal physical examination, and normal EKG. This specific clinical condition 75 is provided to the second database 104 for determination of the medical care alternatives and corresponding marginal clinical utilities and co-payments.

Continuing with the example for specific clinical condition A, for the three medical care alternatives 80 provided in FIG. 4 (i.e., exercise stress test, thallium, and cardiac catheterization), the marginal clinical utilities 85 and variable co-payments 90 are shown in the cells in the top row of the second database 104. As shown in the leftmost cell, for the specific clinical condition in cell A of the first database 102, the exercise stress test provides approximately 20% sensitivity over a history, physical, and EKG exam only (see FIG. 4). Accordingly, the health insurance company assigns a 10% co-payment to the patient 20. Reading across the top row in the second database 104, a thallium test providing approximately 10% additional sensitivity over the exercise stress test is assigned a patient co-payment of 20% by the health insurance company. Continuing in the first row of the second database 104, a cardiac catheterization provides approximately 8% additional sensitivity over the thallium test but with a large increase of cost (see FIG. 4). Accordingly, the health insurance company assigns a variable co-payment of 50% for the patient to undergo a cardiac catheterization. Thus, the variable co-payments vary inversely with the marginal clinical utilities.

A second example is provided in FIG. 7 for the case of a specific clinical condition 75 described by an atypical chest pain, normal physical examination, and abnormal EKG, as shown in cell B of the first database 102. Reading from left to right across the second row of the second database 104, the marginal clinical utilities and inversely-related variable co-payments are provided. In this example for specific clinical condition B, a diagnostic sensitivity percentage is not as well known as in the first example, so three levels of marginal clinical utility, namely low, medium and high, have been assigned by the independent panel of physicians with respect to the medical care alternatives 80. Thus, for the specific clinical condition B, the thallium stress test provides a high marginal clinical utility, and the health insurance company requires a 0% co-payment from the patient 20. Reading across the same row, the exercise test provides a low marginal clinical utility, and the health insurance company requires the patient 20 to pay a 50% co-payment. It should be noted that the results of the exercise test cannot be determined in the absence of an abnormal EKG and that the thallium stress test includes exercise; thus, the exercise test provides little marginal clinical utility, resulting in a higher patient co-payment.

Continuing to read across the same row, for the cardiac catheterization, the independent panel of physicians 40 has assigned a medium marginal clinical utility, and the health insurance company requires the patient 20 to pay a 20% co-payment. Again, the co-payments have been assigned by the insurance company based on the marginal clinical utility achieved by the tests.

At the end of this two-database process, the treating physician 30 and patient 20 are provided with the results based on the clinical factors 50. The results include the specific clinical condition 75, medical care alternatives 80, marginal clinical utilities 85, and variable co-payments 90. It should be understood that the databases can be expanded to include additional medical care alternatives data, such as diagnostic data, therapeutic data, or surgical data. Further, the marginal clinical utilities 85 can be provided with finer gradation, such as a scale of one through nine.

Figure 8:
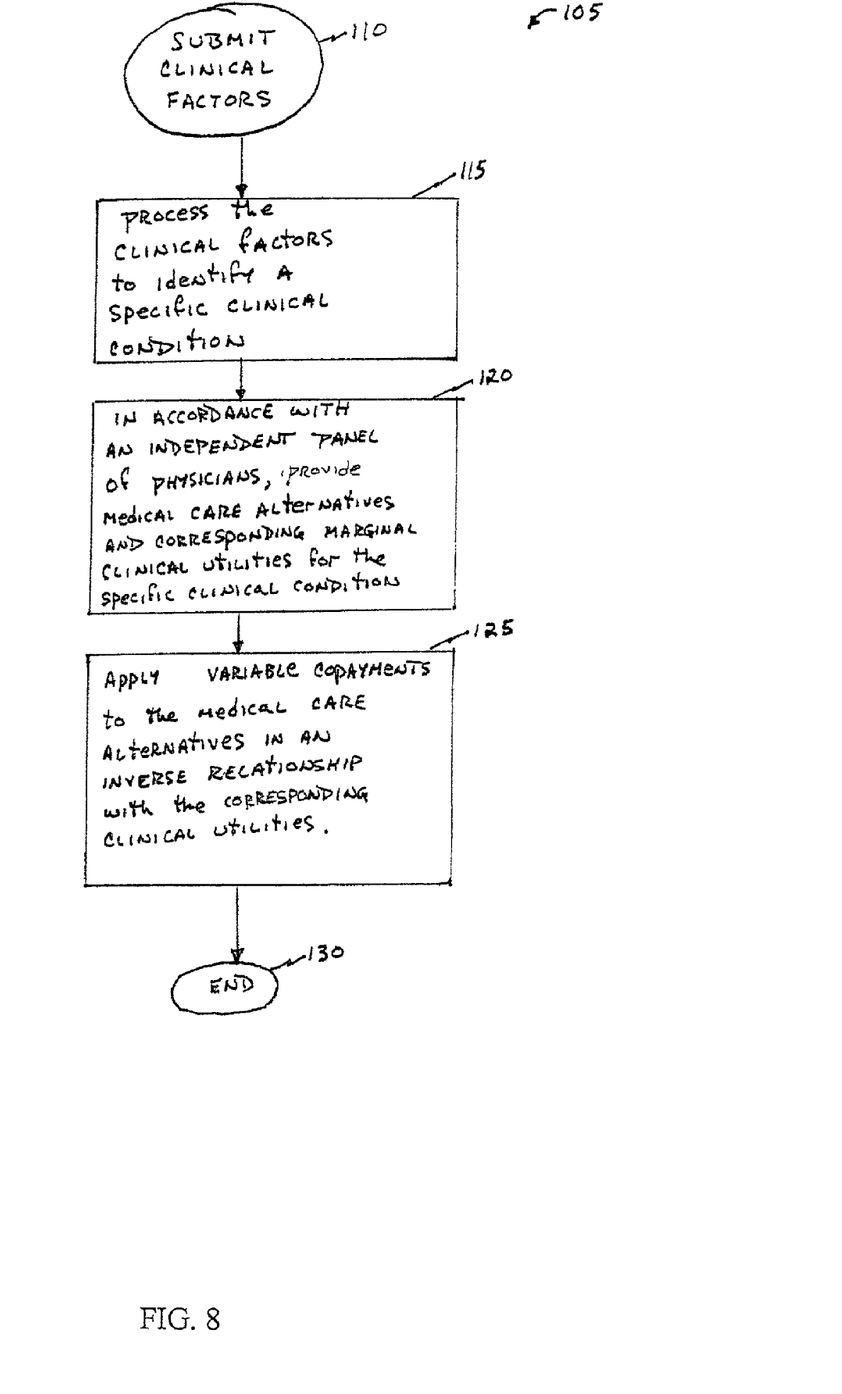
FIG. 8 is a flow diagram of an embodiment of a generalized process of the medical insurance system embodied in FIGS. 5 and 6.

FIG. 8 is a flow diagram of an embodiment of a generalized process described in FIGS. 5-7. The process 105 begins when a treating physician submits clinical factors 110. In step 115, the process 105 identifies a specific clinical condition by processing the clinical factors. Continuing in step 120, the process 105, in accordance with an independent panel of physicians, provides medical care alternatives and corresponding marginal clinical utilities for the specific clinical condition.

In step 125, the process 105 applies variable co-payments to the medical care alternatives in an inverse relationship with the corresponding clinical utilities. The process 105 ends in step 130.

Figure 9:
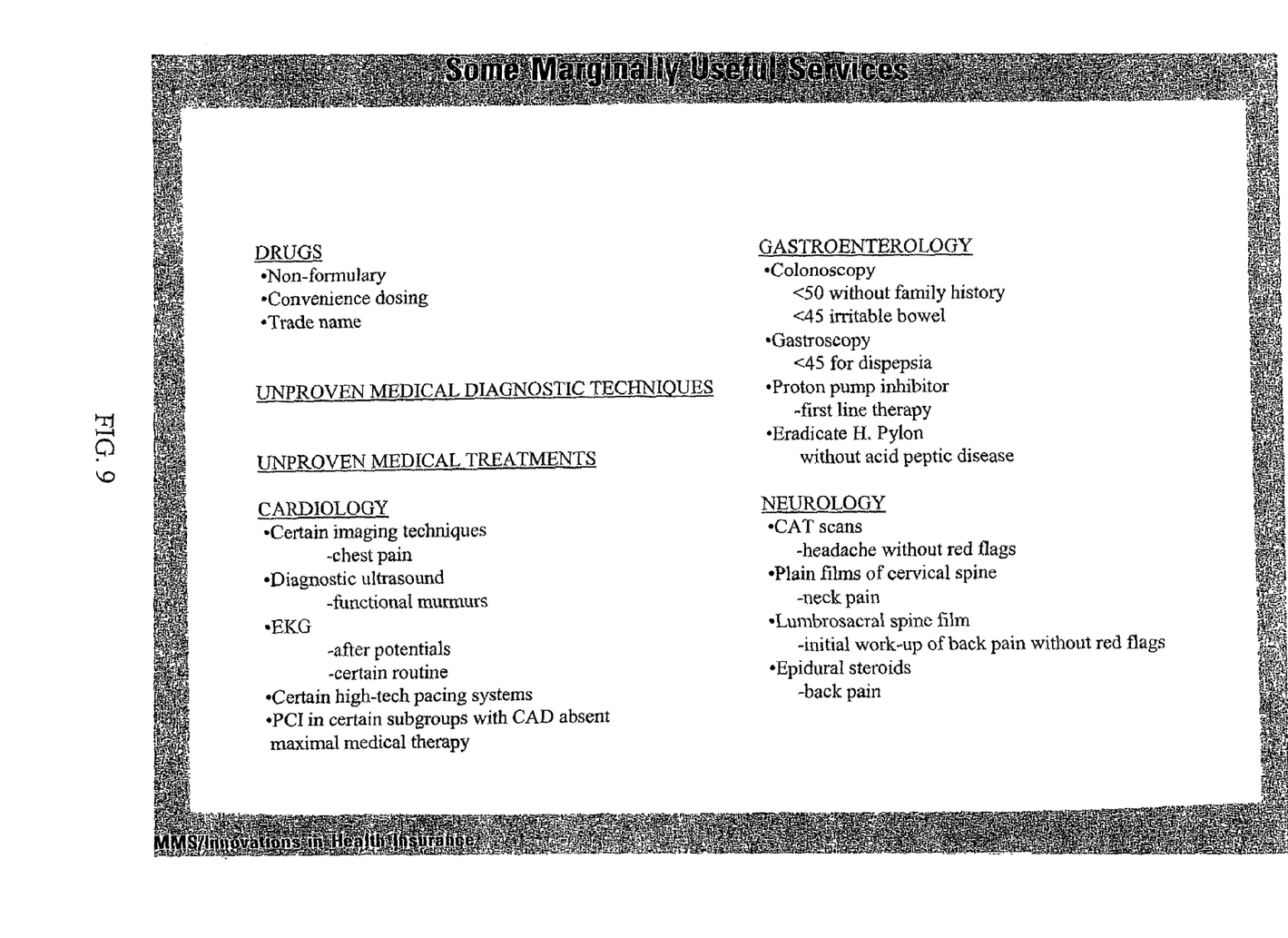
FIG. 9 is a list of exemplary marginally useful services for a few medical specialties optionally covered by the medical insurance system described by the flow diagram of FIG. 8.

For purposes of illustration, FIG. 9 includes a list of a few of what might be marginally useful services for a few medical specialities.

While this invention has been particularly shown and described with references to preferred embodiments thereof, it will be understood by those skilled in the art that various changes in form and details may be made therein without departing from the scope of the invention encompassed by the appended claims.

For example, the inputs from the independent panel of physicians 40 could be augmented with inputs from various other sources, such as: health commissions, panels, studies, medical review boards, journals, research, and patients having undergone treatment or surgery or diagnostic testing related to the specific clinical conditions. Thus, feedback from actual patients and other studies can be used to enhance the data provided in response to the clinical factors 50.

In addition to the data provided by the databases described above, other data useful to the treating physician 30 and the patient 20 for making health care decisions may also be provided by the databases. For example, a list of articles, web sites, or other third party sources of information can be provided for study by the treating physician 30 and/or patient 20.

Further, the computer 55 depicted at the treating physician's office (see FIG. 6) may be any form of computing device, such as a personal digital assistant (PDA), or other wireless communication or computing device, thus making access to the data contained in the databases 70, 95 (FIG. 6) accessible at remote locations, such as nursing homes, hospital rooms, emergency rooms, etc.

Although described as a single form of medical insurance, it should be understood that there could be various grades of tiered co-payments, definable by the insurance company or independent panel of physicians 40. Thus, the patient 20 can opt for various levels of economic based services having different degrees of co-payment risk. Further, the insurance policies can be offered or integrated with various forms of present day health care systems, including managed health care, health maintenance organizations (HMO), preferred provider organizations (PPO), medical savings accounts (MSA), indemnity health plans, and non-risk contracting forms of health plans.

What is claimed is:

1. A method for determining a variable medical co-payment according to marginal clinical utility, comprising:
    processing a set of clinical factors through use of at least one computing device to identify a specific clinical condition;
    accepting data from at least one medical source by an independent panel of physicians, the data describing medical care alternatives producing marginal differences in outcome which define respective marginal clinical utilities for a patient with the specific clinical condition; and
    through use of at least one computing device, applying variable co-payments to the medical care alternatives in an inverse relationship with the corresponding marginal clinical utilities,
    wherein the processing, applying, or both are executed by a database operating on at least one computing device.

2. The method as claimed in claim 1, wherein the medical care alternatives include diagnostic, therapeutic, or surgical options.

3. The method as claimed in claim 1, further including receiving the clinical factors from a treating physician.

4. The method as claimed in claim 1, used by an insurance system, wherein benefits provided by the insurance system are described according to the relationship between the marginal clinical utilities and variable co-payments.

5. A system for determining a variable medical co-payment according to marginal clinical utility, comprising:
    a diagnosing unit processing a set of clinical factors to identify a specific clinical condition;
    a clinical options unit providing data from at least one medical source, the data being accepted by an independent panel of physicians and describing medical care alternatives producing marginal differences in outcome which define respective marginal clinical utilities for a patient with the specific clinical condition; and
    a specification unit applying variable co-payments to the medical care alternatives in an inverse relationship with the marginal clinical utilities.

6. The system as claimed in claim 5, wherein the medical care alternatives include diagnostic, therapeutic, or surgical options.

7. The system as claimed in claim 5, wherein at least one of the units includes a database operating on a computing device.

8. The system as claimed in claim 5, wherein the diagnosing unit receives the clinical factors from a treating physician.

9. The system as claimed in claim 5, used by an insurance system, wherein benefits provided by the insurance system are described according to the relationship between the marginal clinical utilities and variable co-payments.

10. A computer network having a process executed therein for determining a variable medical co-payment according to marginal clinical utility, comprising:
    a first node to which a set of clinical factors are entered to identify a specific clinical condition;
    a second node storing the results of a process by which an independent panel of physicians accepts data from at least one medical source that describes medical care alternatives producing marginal differences in outcome which define respective marginal clinical utilities for a patient with the specific clinical condition; and
    a network link between the first node and the second node to access a variable co-payment applied to the medical care alternatives in an inverse relationship with the marginal clinical utilities.

11. The computer network as claimed in claim 10, wherein the medical care alternatives include diagnostic, therapeutic, or surgical options.

12. The computer network as claimed in claim 10, wherein at least one of the nodes employs a database.

13. The computer network as claimed in claim 10, wherein the clinical factors are entered to the first node by a treating physician.

14. The computer network as claimed in claim 10, used by an insurance system, wherein benefits provided by the insurance system are described according to the relationship between the marginal clinical utilities and variable co-payments.

15. An apparatus for determining a variable medical co-payment according to marginal clinical utility, comprising:
   means for processing a set of clinical factors to identify a specific clinical condition;
   means for storing data, from at least one medical source, accepted by an independent panel of physicians, the data describing medical care alternatives producing marginal differences in outcome which define respective marginal clinical utilities for a patient with the specific clinical condition; and
   means for applying variable co-payments to the medical care alternatives in an inverse relationship with the marginal clinical utilities.

* * * * *

UNITED STATES PATENT AND TRADEMARK OFFICE
CERTIFICATE OF CORRECTION

| | | |
|---|---|---|
| PATENT NO. | : 8,352,291 B2 | Page 1 of 1 |
| APPLICATION NO. | : 09/962931 | |
| DATED | : January 8, 2013 | |
| INVENTOR(S) | : Rubenstein | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2289 days.

Signed and Sealed this

Second Day of December, 2014

Michelle K. Lee
*Deputy Director of the United States Patent and Trademark Office*